Oct. 18, 1955  S. L. ROOT, JR  2,720,937

FILTER CONSTRUCTION

Filed March 22, 1952

INVENTOR.
Samuel L. Root Jr.
BY
atty.

United States Patent Office

2,720,937
Patented Oct. 18, 1955

2,720,937
FILTER CONSTRUCTION

Samuel L. Root, Jr., Syracuse, N. Y., assignor, by mesne assignments, to Cambridge Filter Corporation, a corporation of New York Application March 22, 1952, Serial No. 277,984

8 Claims. (Cl. 183—71)

This invention relates to filter construction and more particularly to a filter construction of high efficiency in which resistance to flow of gaseous or vapor medium through the filter is decreased.

This invention relates to a filter construction adapted to filter solid and liquid particles from gases and vapors. It comprises a frame work which forms a passage for a gaseous or vapor medium. Filter material is arranged in pleat formation across the passage formed by the frame work. Corrugated spacing members separate the pleats of the filter material. The corrugations of each member form channels through which medium flows contiguous to the pleats of the filter material. At least a wall of each channel is formed by the filter material. The corrugations of the spacing members taper in height from one end of the spacing member to substantially its opposite end. The spacing members are alternated in the structure so that the inlet channels, channels extending into the filter construction from the inlet side thereof, are of decreasing dimensions in the direction of flow of medium while the outlet channels, channels extending into the filter construction from the outlet side thereof, are of increasing dimensions in the direction of flow of medium. Preferably, the corrugations are so formed that the cross-sectional area of each inlet channel decreases uniformly from the inlet end of the channel to its opposite end while the cross-sectional area of each outlet channel increases uniformly from its end to the outlet thereof. This channel construction reduces medium velocity at the inlet and at the outlet so that more satisfactory medium flow through the assembled filter is obtained.

The attached drawing illustrates a preferred embodiment of my invention in which.

Figure 1:
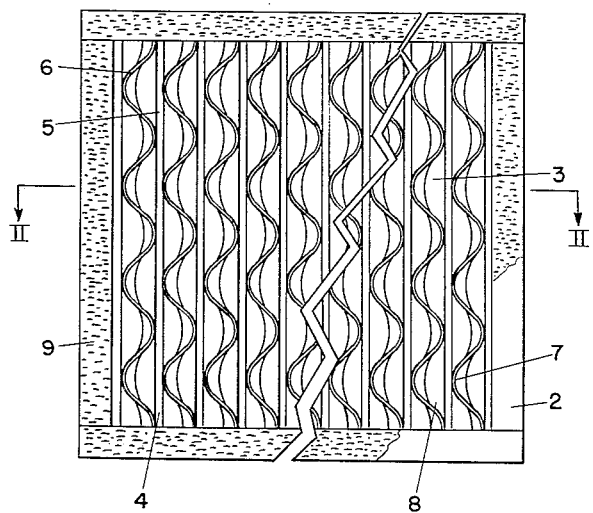
Figure 1 is a view in front elevation of a filter construction embodying the present invention.
Figure 2:
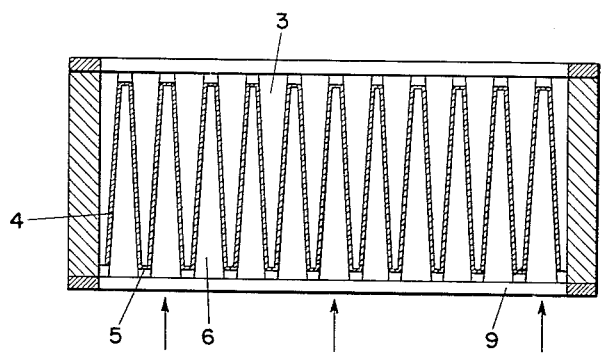
Figure 2 is a sectional view through the filter construction taken on the line II—II of Figure 1, the spacing members being omitted.

Referring to the attached drawing, there is shown the filter construction of the present invention. This filter comprises a frame work 2 forming a passage 3 through which the gaseous or vapor medium to be filtered passes. A filter material 4 arranged in the form of pleats 5 is placed across passage 3. Spacer members 6 separate pleats 5 from one another. Preferably, members 6 are formed of cardboard or similar material. Each spacer member 6 is corrugated, as shown at 7, the corrugations cooperating with the adjacent pleats 5 to form channels 8 through which the medium flows, medium passing from the inlet channels through the pleats 5, and through the outlet channels to the outlet of passage 3 formed by frame work 2.

Figure 3:
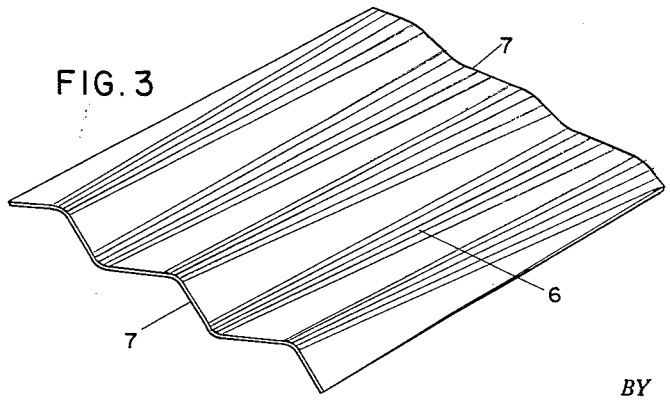
Figure 3 is an isometric of a portion of a spacing member.

To decrease resistance of the filter material to the passage of medium, corrugations 7 are tapered, as best shown in Figure 3. Inlet channels formed by the tapered corrugations 7 and the pleats 5 of filter material are of decreasing dimensions in the direction of flow of medium through the filter. That is, the depth or height of each corrugation decreases in the direction of flow of medium through the filter so that the inlet channels are of decreased area in cross section in the direction of flow of medium through the channel. Outlet channels formed by interposed spacer members are of increasing dimensions in the direction of flow of medium through the construction. That is, the depth or height of each corrugation increases in the direction of flow of medium through the filter so that the outlet channels are of increased area in cross section in the direction of flow of medium through the material. The ratio of the area at the inlet end of each inlet channel or at the outlet end of each outlet channel as compared to the area at the opposite end of the channel falls within the range of 16–1 to 8–1. The cross-sectional area of each inlet channel is decreased uniformly from the inlet end of the channel to its opposite end.

The area of the air inlet to the channels may be increased over customary procedure without increasing the size of the filter. This increase in inlet area decreases velocity of medium flow through the channels. The decrease in velocity of air entering each channel decreases the turbulence of medium within the channel and increases the static pressure, thus permitting medium to pass through the filter material more uniformly and rapidly, decreasing the resistance of the assembled filter construction to passage of medium therethrough. Outlet channels are of similar proportions except that they increase in cross-sectional area in the direction of flow of medium.

Preferably, the filter material 4 and the spacing members 6 are adhesively secured to the frame work to hold the filter in place therein. Adhesively securing the pleats of the filter material and the spacing members to the frame work does not affect substantially flow of air therethrough. If desired, sealing members 9 may be secured to the frame work 2 to prevent bypassing of the filter thus assuring flow of medium through the passage formed by the frame work. Preferably sealing members 9 are formed of sponge rubber or similar material.

The filter material 4 is formed as disclosed in United States Patent No. 2,507,827 granted May 16, 1950, to Earl Stafford and Horace N. Lee. The filter material consists of a substantially uncompacted and homogenized mixture of mineral fibers, short organic fibers, and long organic fibers. A furnish satisfactory for formation of the filter material is as follows: 5% caroa fiber, 47.5% precut viscous fiber, 47.5% precut purified cotton fiber. To this furnish may be added from 3 to 15% of mineral fiber such as asbestos fibers.

In the above furnish, other long reinforcing fibers such as manila hemp, rag fiber, and the like, may be used in place of the caroa fiber. Other short fibers, of course, may be substituted for the viscous fiber and cotton fibers. It is important that the mineral fibers have a diameter less than about three microns.

The fibers are mixed and formed into a sheet which is fifty one-thousandths of an inch or less in thickness in accordance with usual practice. It is important, however, that the sheet so formed not be compacted to any substantial extent during formation. Reference is made to the patent recited above for a more complete description of the manufacture of the filtering material.

To provide the tapered corrugations 7 in the spacing members 6, fluting rolls may be employed to form corrugations in material having a semi-ring-shaped contour. If desired, of course, the corrugations may be formed by a suitable stamping operation.

The present invention provides a filter construction containing tapered flow passages which result in improving flow characteristics by reducing medium velocity in the passages. The filter construction of the present invention provides a reduction in resistance to flow of gases or vapor therethrough.

By increasing the areas of the channel inlets medium velocity into the filter is decreased. Similarly, increasing the areas of the channel outlets aids in reducing medium velocity through the filter. This decrease in velocity into and through the channels assists in eliminating turbulence of flow in the channels and serves to increase static pressure therein. The increase in static pressure and the decrease in turbulence permit the gases or vapor to be filtered to pass through the filter material more uniformly and rapidly. The present construction takes advantage of tapered passages on both sides of the filter material to achieve more satisfactory air flow.

While I have described a preferred embodiment of my invention, it will be understood my invention is not limited thereto since it may be otherwise embodied within the scope of the following claims.

I claim:

1. In filter construction adapted to filter solid and liquid particles from gases and vapors, the combination of frame work forming a passage for gaseous or vapor medium, filter material arranged in pleat formation across the passage to filter said gaseous or vapor medium passing through the passage, corrugated spacing members separating the pleats of said material, the corrugations of each member forming channels through which medium flows contiguous to the pleats of the filter material, at least a wall of each channel being formed by the filter material, said corrugations tapering in height from one end of the spacing member to substantially its opposite end to form tapered inlet and outlet channels, said inlet channels decreasing in dimensions in the direction of flow of medium and said outlet channels increasing in dimensions in the direction of flow of medium whereby velocity of medium entering each channel is decreased, decreasing turbulence of medium within the channel and increasing static pressure within the channel to decrease resistance to passage of medium through the filter construction.

2. A filter construction according to claim 1 in which the ratio of the area at one end of each channel as compared to the area at the opposite end of the channel falls within the range of 16-1 to 8-1.

3. A filter construction according to claim 2 in which the cross-sectional area of each inlet channel decreases uniformly from the inlet end of the channel to its opposite end and the cross-sectional area of each outlet channel increases uniformly in the direction of flow of medium.

4. A filter construction according to claim 3 in which the filter material comprises a homogeneous mass of cellulose fibers predominately a few millimeters in length, mixed with a comparatively small quantity of mineral fibers of diameters less than about three microns and formed into a sheet which is fifty one-thousandths of an inch or less in thickness.

5. In filter construction adapted to filter solid and liquid particles from gases and vapors, the combination of frame work forming a passage for a gaseous or vapor medium, filter material arranged in pleat formation across said passage to filter said gaseous or vapor medium passing through the passage, said material comprising a substantially uncompacted and homogenized mixture of mineral fibers, short organic fibers, and long organic fibers, corrugated spacing members separating the pleats of said material, the corrugations of each member forming channels through which medium flows contiguous to the pleats of filter material, at least a wall of each channel being formed by the filter material, said corrugations tapering in height from one end of the spacing member to substantially its opposite end to form tapered inlet and outlet channels, said inlet channels decreasing in dimensions in the direction of flow of medium and said outlet channels increasing in dimensions in the direction of flow of medium whereby velocity of medium entering each channel is decreased, decreasing turbulence of medium within the channel and increasing static pressure within the channel to decrease resistance to passage of medium through the filter construction.

6. A filter construction according to claim 5 in which the ratio of the area at one end of the channel as compared to the area at the opposite end of the channel falls within the range of 16-1 to 8-1.

7. A filter construction according to claim 6 in which the cross-sectional area of each inlet channel decreases uniformly from the inlet end of the channel to its opposite end and the cross-sectional area of each outlet channel increases uniformly in the direction of flow of medium.

8. A filter construction according to claim 5 in which sealing material is provided on opposite sides of the frame work to assure passage of medium through the filter material.

References Cited in the file of this patent

UNITED STATES PATENTS

| | | |
|---|---|---|
| 2,008,751 | Davies | July 23, 1935 |
| 2,410,371 | Vokes | Oct. 29, 1946 |
| 2,507,827 | Stafford et al. | May 16, 1950 |
| 2,643,735 | Logsdon | June 30, 1953 |